(12) United States Patent
Sundaram

(10) Patent No.: US 11,475,505 B2
(45) Date of Patent: *Oct. 18, 2022

(54) METHOD AND SYSTEM FOR AUTOMATIC END-TO-END PREPARATION AND MANAGEMENT OF FOOD

(71) Applicant: Vishnu Gurusamy Sundaram, Bangalore (IN)

(72) Inventor: Vishnu Gurusamy Sundaram, Bangalore (IN)

(73) Assignee: Vishnu Sundaram, Karnataka (IN)

( * ) Notice: Subject to any disclaimer, the term of this patent is extended or adjusted under 35 U.S.C. 154(b) by 0 days.

This patent is subject to a terminal disclaimer.

(21) Appl. No.: 16/845,703

(22) Filed: Apr. 10, 2020

(65) Prior Publication Data
US 2020/0242680 A1 Jul. 30, 2020

Related U.S. Application Data

(63) Continuation-in-part of application No. 15/299,856, filed on Oct. 21, 2016, now Pat. No. 10,657,577.

(30) Foreign Application Priority Data

Oct. 21, 2015 (IN) .......................... 5034/CHE/2015

(51) Int. Cl.
*G06Q 30/06* (2012.01)
*G06Q 10/08* (2012.01)
(Continued)

(52) U.S. Cl.
CPC ....... *G06Q 30/0633* (2013.01); *G06Q 10/087* (2013.01); *G06Q 50/12* (2013.01); *H04L 67/10* (2013.01); *H04L 67/125* (2013.01)

(58) Field of Classification Search
CPC .. G06Q 30/0633; G06Q 10/087; G06Q 50/12; G06Q 30/00; H04L 67/125; H04L 67/10
(Continued)

(56) References Cited

U.S. PATENT DOCUMENTS 9,438,678 B2* 9/2016 DeSalvo ................. H04L 67/12
9,740,998 B2* 8/2017 Cartwright ............ H04L 65/612
(Continued)

OTHER PUBLICATIONS

Lui TJ, Automation in Home Appliances, Springer Handbook of automation, dated 2009. (Year: 2009).*

*Primary Examiner* — Mark A Fadok
(74) *Attorney, Agent, or Firm* — Barry Choobin; Patent 360LLC

(57) ABSTRACT

The embodiments herein provide a method and system for providing an integrated cooking machine, which automates the process of cooking completely and support connected operation in the cooking such as share recipes, order recipes and even support connecting with the ingredient supplier ecosystem for ordering the required item, thereby eliminating several food processing machines and even to the extent of removing kitchen in a house. The system includes electro-mechanical components for performing the cooking operation, which is driven by electronic circuits fed by programs that make this operation happen. The programs are stored in the device or downloaded from the cloud platform, which authenticates these machines and provide the required information. The system also has intuitive interface on the device to create recipes. The system is also configured to measure the output parameters of the food.

9 Claims, 10 Drawing Sheets

(51) Int. Cl.
*G06Q 50/12* (2012.01)
*H04L 67/125* (2022.01)
*H04L 67/10* (2022.01)

(58) Field of Classification Search
USPC .................................................. 705/26.8
See application file for complete search history.

(56) References Cited

U.S. PATENT DOCUMENTS

| | | | |
|---|---|---|---|
| 10,067,482 B2 * | 9/2018 | Hepperla | A47J 36/00 |
| 10,346,899 B2 * | 7/2019 | Holman | G07F 9/10 |
| 2013/0052616 A1 * | 2/2013 | Silverstein | G09B 19/0092 |
| | | | 434/127 |
| 2014/0324607 A1 * | 10/2014 | Frehn | G06Q 50/12 |
| | | | 705/15 |
| 2015/0186966 A1 * | 7/2015 | Holman | G07F 17/26 |
| | | | 705/15 |
| 2015/0279175 A1 * | 10/2015 | Hyde | G06Q 10/087 |
| | | | 340/815.4 |
| 2015/0290795 A1 * | 10/2015 | Oleynik | B25J 9/0081 |
| | | | 700/257 |

* cited by examiner

METHOD AND SYSTEM FOR AUTOMATIC END-TO-END PREPARATION AND MANAGEMENT OF FOOD

CROSS-REFERENCE TO RELATED APPLICATION

The present application is a Continuous-Improvement-Patent (CIP) application of the US patent application with Ser. No. 15/299,856 filed on Oct. 21, 2016 with the title, "A METHOD AND SYSTEM FOR AUTOMATIC END-TO-END PREPARATION AND MANAGEMENT OF FOOD", and the contents of which is included entirely as reference herein. The present application claims the priority of the Indian Provisional Patent Application (PPA) with serial number 5034/CHE/2015 filed on Sep. 21, 2015 and subsequently post-dated by 1 month to Oct. 21, 2015 with the title, "A METHOD AND A SYSTEM FOR COOKING BY COMMUNITY PROGRAMMED INSTRUCTIONS" and the contents of which is included entirely as reference herein.

BACKGROUND

Technical Field

The embodiments herein are generally related to management and preparation of food. The embodiments herein are particularly related to a system for automated management of food and food ingredients. The embodiments herein are more particularly related to a system for automatic end-to-end preparation and management of food. The embodiments herein are also related to a system to monitor food intake pattern of users and automatically prepare food based on diet needs of users.

Description of the Related Art

Cooking food has always been a task handled by humans, although various machines, tools and equipments assist humans in cooking food. Apart from the actual process of cooking food, there is a plurality of processes involved in producing food, right from procuring the ingredients for cooking to preparing food as per the need of every person.

Currently, a plurality of appliances and machines aid humans in preparing food by assisting humans in tasks such as crushing, grinding, cutting and the like. Existing assistive solutions are just food processing machines, in most cases standalone devices that perform a very specific task. However, human actions and decisions are necessary to complete the actual task of end-to-end cooking. At present, there is no automatic systems that manage end-to-end preparation and management of food.

Traditionally, the cooking is either concluded after visual inspection (in open cooking) and based on time (in closed cooking). In these methods, the cooking recipe has to be re-written based on the quantity of food.

Presently, whether it is home cooking, restaurant cooking or other large scale cooking feeding, the quest is always on for more efficient equipment to make the cooking process efficient. The quest for efficiency has resulted in equipments like the pressure cooker which significantly speeds up the cooking process by increasing the temperature of cooking medium (water) beyond its normal boiling point, thereby decreasing the time required to cook food in the cooking medium.

This produces its own problems. At such high pressures, safety issues arise, food gets overcooked and becomes colorless, texture less and tasteless. The agitation of water causes food to lose its shape. In an effort to avoid discoloration, loss of texture and shape, it is common practice to use steaming. It is apparent, however, that steaming causes use loss, flavor loss and loss of texture. To retain color, stir frying or grilling is commonly used where food is heated at a high temperature for a short time, either in a very hot pan or over naked fire. This method produces superior color, texture and flavor, but results in loss of nutrients and requires skilled manual supervision. A few seconds can make the difference between well cooked food and undercooked or burnt food. These high temperatures also cause significant burning, which can lead to production of carcinogens, resulting in health issues.

To reduce the risk of burning it has been proposed that the food be cooked with specially designed utensils at a lower heat. Cooking in this manner reduces chance of burning but cannot produce the intense colors and textures which stir frying or grilling produces. This method also demands manual skill to judge when food is cooked. A novice user using these equipments ends up with overcooked or undercooked food.

Microwave cooking eliminates much of this trouble, but it has its own drawbacks. Food gets overcooked or undercooked unless cooked by a skilled person. It dries out food from the inside, causing food to lose its juiciness.

Further, the deep-frying process for food comprises the following characteristics; a temperature range is around 170-190 C; Oil absorption is more than 25 percent; acrylamide, a carcinogen starts forming at above 150° C.; leads to a loss of natural color and flavors; toxic oil smoke; messes up your kitchen; Grime/gunk deposited everywhere; Chimney/exhaust is mandatory; More free radicals are formed; More oxidation; reduced shelf life; not possible to use Cold pressed oils; Oils break down faster; no reuse over 3-4 times; needs skill for performing deep frying process; spattering is likely; requires greater fuel consumption; and drier output.

Any skilled person knows well that moist foods absorb more oil than dry foods; porous foods absorb more oil than dense foods; viscous oils get absorbed more than light oils; more the cuts, more the oil absorption; blanching reduces absorption (due to a combination of factors); pre-drying reduces oil absorption; and coating the surface closes the pores and reduces oil absorption.

Hence there is a need for a technique to fry food at lower temperatures than traditional frying methods. Low temperature frying is essential to reduce oil absorption, carcinogenic risks and oil breakdown. It is essential to retain more nutrients and inherent colour. As of now, the world has two technologies. They are known as Vacuum frying and Cold frying. In vacuum frying in which oil is heated in a vacuum chamber and food is added. In Cold Frying process, the food is immersed in cold oil and both are heated together Hence there is a need for adding one more tool as a Cold Pressure Frying. Hence there is a need for a cooking appliance for performing the Cold Pressure Frying process, by immersing the food in cold oil and heating both oil and food together under pressure.

Hence there is a need for a cooking appliance or system to obtain/achieve all of the culinary advantages associated with grilling, stir frying, cold frying, and pressure cooking. Yet there is a need for a cooking appliance or system to cook food rapidly with very less chances of burning, without the loss of texture, color or flavor. Still further there is a need for a cooking appliance or system to stop cooking at the right time, thereby ensuring even complete novices/semiskilled personnel to cook perfect food, without any skill.

Still further there is a need for an intelligent system to replace any human intervention in the process of preparation of food. There is also a need for a system to manage end-to-end management of food preparation and all the activities related to food preparation and management.

The abovementioned shortcomings, disadvantages and problems are addressed herein and which will be understood by reading and studying the following specification.

OBJECT OF THE EMBODIMENTS HEREIN

The primary object of the embodiments herein is to provide a system for automatic end-to-end preparation and management of food.

Another object of the embodiments herein is to provide a platform, for integrating various discrete food processing components and computing applications to completely automate the process of cooking as per the requirements and needs of a user.

Yet another object of the embodiments herein is to maintain an inventory of cooking items.

Yet another object of the embodiments herein is to decide time of reordering items, replenishing ingredients, ordering food automatically, to enable the material suppliers to refill, and the like.

Yet another object of the embodiments herein is to provide a storage for a plurality of types of ingredients.

Yet another object of the embodiments herein is to provide a method and a system that leverages on the processing power, connectivity features, vision, hearing capabilities and other monitoring capabilities of an external computing system such as a mobile phone.

Yet another object of the embodiments herein is to provide a method and system for creating a machine that is configured to be agile during a selection menu such as boiled milk in the morning, fruit salad for appetizer, bread and baked beans for breakfast, and a fruit juice after that for a day.

Yet another object of the embodiments herein is provide a packaged food for lunch such as fried rice, boiled vegetables, etc., and keep the food ready for dinner like Pizza, etc.

Yet another object of the embodiments herein is to provide an automatic cooking appliance that is agile and executes the instructions required for preparing variety of foods and preserve them.

Yet another object of the embodiments herein is to provide a method and system that maintains the inventory of the cooking items, and decides a time of reordering provisions, replenishing the ingredients, and ordering food automatically, to enable the material suppliers/providers to refill, and the like.

Yet another object of the embodiments herein is to provide a cooking appliance that stores a plurality of mutually different ingredients in a mutually different way.

Yet another object of the embodiments herein is to store the processed food in a different manner. The automatic cooking appliance is designed to store a plurality of processed foods such as boiled milk, ice creams, fried rice, and the like. The cooking appliance is automated and is provided with (artificial) intelligence to cater the changing requirements.

Yet another object of the embodiments herein is to understand the patterns of eating, selecting or estimating the required ingredients, calculating a time or period of ordering and placing an order for the required ingredients.

Yet another object of the embodiments herein is to normalize the cooking instructions to be understood by a plurality of users at a plurality of geographical locations.

Yet another object of the embodiments herein is to provide a software and cloud platform for enabling users to create and store recipes, share the recipes, and monetize from them.

Yet another object of the embodiments herein is to provide a possibility of operating a restaurant virtually.

Yet another object of the embodiments herein is to provide a machine to keep track of the calories in the cooked food to decide missing the nutrients, for recommending a suitable and appropriate kind of food for the future meals or subsequent meals.

Yet another object of the embodiments herein is to understand a health condition of the user to estimate the required ingredients for use with a given user. For e.g. the machine is configured to use lower sugar ingredients when the user is a diabetic person.

Yet another object of embodiments herein is to utilize the appliance of the same design to prepare personalized medication using formula (i.e., recipe in the cooking world) instead of generic formula prescription drugs.

Yet another object of embodiments herein is to build a complete home without a kitchen by replacing a kitchen with a small appliance that is placed in any room.

Yet another object of embodiments herein is to develop a cooking appliance or system to obtain/achieve all of the culinary advantages associated with grilling, stir flying, cold frying, and pressure cooking.

Yet another object of the embodiments is to develop a cooking appliance or system to cook food rapidly with very less chances of burning, without the loss of texture, color or flavor.

Yet another object of the embodiments is to develop a cooking appliance or system to stop cooking at the right time, thereby ensuring even complete novices/semiskilled personnel to cook perfect food, without any skill.

Yet another object of the embodiments is to develop a cooking appliance or system for performing Cold Pressure Frying process in which the food is immersed in cold oil; and both the oil and the food are heated together under pressure.

Yet another object of the present invention is to develop a cooking appliance/system for performing cold pressure frying process by combining the elements of both vacuum frying and cold frying processes thereby dramatically reducing oil absorption, and creating a crunchy shell and a buttery soft interior for starchy vegetables like banana, taro and yam.

These and other objects and advantages of the embodiments herein will become readily apparent from the following summary and the detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings.

The various embodiments herein provide a system for automatic end-to-end preparation and management of food. The embodiments also provide a system to monitor food intake pattern of users and automatically prepare food based on diet needs of users.

According to an embodiment herein, an automatic food preparation and management system that is distributed across a plurality of geographic locations is provided. The system comprises a hardware processor, a memory module, an analytics module, a plurality of end-point devices, a cloud computing module, a communication module, a sensors module, an inventory management module, and a recipe and menu building module. The memory module comprises a plurality of connected digital data storage devices and comprises digital data of the automatic food preparation and management system. The analytics module is stored in the memory module. The end-point devices comprise kitchen appliances and food processing machines located in a plurality of geographical locations. The cloud computing module connects a plurality of remotely located end-point devices. The communication module enables communication between a plurality of end-point devices. The sensors module comprises a plurality of sensors connected to the analytics module, the cloud computing module and the communication module. The inventory management module is connected to the analytics module, the cloud computing module and the communication module. The recipe and menu building module is connected to the analytics module, the cloud computing module and the communication module.

According to an embodiment herein, an analytics module is run on the processor. The analytics module is configured to analyze the inputs from a plurality of sensors and end-point devices. The analytics module is further configured to decide the type of food to be prepared by the system based on the inputs from the plurality of sensors and end-point devices. The analytics module is configured to send instructions to the plurality of end-point devices through the communication module.

According to an embodiment herein, a plurality of end-point devices are provided. The plurality of end-point devices comprise kitchen appliances that are connected to the cloud computing module. The plurality of end point devices are configured to receive instructions from the analytics module for cooking food. All the end-point devices are configured to work independently and in coordination with other end-point devices.

According to an embodiment herein, the plurality of end-point devices are provided with add-on modules that enable the end-point devices to connect to the system through the cloud computing module.

According to an embodiment herein, the sensors module comprises a plurality of sensors that measure an availability of ingredients to cook food. The sensors module also comprises a plurality of sensors that measure the food and nutrition intake of a plurality of humans and provide the information about the food and nutrition intake to the cloud computing module.

According to an embodiment herein, the plurality of sensors comprise audio, visual and biometric sensors that are configured to communicate the sensor output to the cloud computing module.

According to an embodiment herein, an inventory management module is run on the hardware processor. The inventory management module is configured to manage the availability of a plurality of ingredients for preparation of food. The inventory management module is also configured to receive the information regarding an availability of ingredients in a plurality of storage locations through the sensors module. The inventory management module is configured to receive the information regarding a type of food the system is scheduled to cook and automatically alert the end-point devices about the availability of the ingredients.

According to an embodiment herein, the inventory management module is configured to order the ingredients through online e-commerce websites and specify the location to which the ingredients are to be delivered.

According to an embodiment herein, the recipe and menu building module is run on the hardware processor. The recipe and menu building module is configured to receive the information regarding a food intake pattern of a user, an amount of nutrients taken by the user and the vital health parameters of the user through a plurality of sensors that are remotely located and connected to the cloud computing module.

According to an embodiment herein, the recipe and menu building module is configured to receive the information about the availability of ingredients at the location of the users and prepare a personalized menu of food to be prepared for every user depending on the availability of ingredients and the health parameters of the user. The recipe and menu building module is configured to provide the recipe of the food to be prepared and the instructions of preparing the food to the end-point devices through the analytics module.

According to an embodiment herein, a cooking appliance or system is provided to obtain/achieve all of the culinary advantages associated with grilling, stir frying, cold frying, and pressure cooking.

According to an embodiment herein, a cooking appliance or system is provided to cook food rapidly with very less chances of burning, without the loss of texture, color or flavor.

According to an embodiment herein, a cooking appliance or system is provided to stop cooking at the right time, thereby ensuring even complete novices/semiskilled personnel to cook perfect food, without any skill.

According to an embodiment herein, this apparatus is a composition of device and cooking techniques aimed at automating cooking and ensuring food retains its shape, color, texture taste and nutrition. This apparatus lets even complete novices cook better than skilled chefs. The apparatus improves the current pressure cooking, microwaving and baking processes.

According to an embodiment herein, this apparatus is designed to cook food at the highest possible heat, for the lowest possible time with little or no water. One part of the heating happens under high pressure. Unlike conventional pressure cooking, the apparatus does not use water or an inner vessel as the high temperature needed is not produced with the presence of water or by the use of an inner vessel. The apparatus is designed to cook food in its own juices. So little or no water or oil is added, unlike traditional cooking where much higher quantity of water is added According to an embodiment herein, the apparatus is designed to cook under the highest possible pressure currently possible at the highest possible heat that is attained without burning, for the lowest possible time to ensure perfect cooking.

According to an embodiment herein, the apparatus is designed to work by cutting food into small pieces and ensuring that foods gets browned from the Maillard reaction, to infuse food with more flavor, unlike traditional pressure cookers where browning is not possible According to an embodiment herein, this apparatus causes food to be cooked at high heat in the beginning, enabling browning reactions to produce complex caramelized flavors, which is impossible to produce by pressure cooking, boiling or steaming.

According to an embodiment herein, this high heat soon causes the apparatus to fill up with steam—mostly produced from food's own juices. This steam is produced mostly from food's own juices. This apparatus ensures this steam buildup happens before food starts getting burnt. Once enough steam has been produced, pressurized baking starts and the temperature of the apparatus drops to prevent burning. As food is completely saturated by steam, all regions are at the same temperature. This eliminates the need for stirring—as all regions get heated evenly. The lack of water reduces agitation and minimizes structural damage of food. The apparatus causes the dry food to be enveloped in pressurized steam, which permeates food, cooking it instantly.

According to an embodiment herein, the apparatus behaves as a pressurized baking oven. The food now gets pressure baked. After a set time is reached, the excess steam is vented out to stop further cooking. This heightens color, texture and flavor. Cooking by any other cooking method like pressure cooking, baking, steaming, boiling or microwaving normally results in the loss of color of vegetables and fruits. Instead, this apparatus is designed to intensify inherent colors, textures and taste of food.

The fruits and vegetables have three kinds of coloring pigments. Chlorophyll—green pigment, Carotenoids—pigments ranging from yellow to deep red, and Flavonoids like anthocyanins—red, blue or purple pigments & anthoxanthin—white pigment. These are found in varying amounts depending on the stage of ripening. Chlorophyll is the green colour of the leaves. It is also present in fruits and vegetables like cabbage, broccoli, kiwi fruit and green apples. Chlorophyll is fat soluble and will be washed out during stir frying with oils. Chlorophyll is also affected by the length of cooking. When the chlorophyll containing vegetables are heated, the air trapped in the tissues escape first. This makes the vegetables bright green in colour initially. With this apparatus, cooking is stopped at this stage, so as to retain that bright colour. Cook is stopped to prevent chlorophyll getting cooked into less bright compounds like Pheophytins. This apparatus is designed to preserve colour by cooking for a short time with little or no oil. The carotenoid pigments are found in lemons, oranges, strawberries and in vegetables like capsicum & carrot. They are fat soluble and easily affected by oxidation. By using sealed cooking with little or no oil, with minimal contact with oxygen, this apparatus brightens up the carotenoid pigment color. The flavonoids (anthocyanins and anthoxanthins) present in brinjals, apples, onions, cauliflowers & potatoes are water soluble. This apparatus is designed to cook them with minimal exposure to water, thus brightening their existing color.

According to an embodiment herein, this apparatus is so designed that the interface maintained between the hot cooking surface and the food vaporizes to form steam that exerts pressure against the food and thus more rapidly transfer heat thereto for assisting in cooking the interior portions thereof, and the heated steam in which the food is immersed assists in cooking the exterior surface of the food while acting to contain flavor elements that tend to escape from food during cooking. Thus, the food is "pressure baked" very quickly and generally evenly without burning and with a minimum of colour loss, texture loss and flavor loss. The shape of food is also maintained perfectly.

According to an embodiment herein, the shape of the cooking surface is designed to maximise heat transfer to food and minimise burning.

According to an embodiment herein, the preferred apparatus includes a pressurised cooking vessel/processing chamber with a dimpled bottom to hold a minimal quantity of water to prevent burning, a valve which rises up to indicate pressure has been built and a release valve which is used to release steam after cooking is completed. The heating element is located underneath and can be mechanically or automatically controlled. the heating element can be gas, induction, electrical hotplate or a wide variety of other ways of heating. The heating is controlled manually or automatically through a remote device such as a cellular phone.

According to an embodiment herein, a method of pressure baking a portion of food, comprising the steps of providing a sealed, pressurised cooking vessel/processing chamber; cooking said food portion at high heat in its own juices at high pressure for a short duration; causing said compressed food portion to be heated up very fast, so as to produce enough steam to pressurise the cooking chamber; applying external heat directly to the bottom and sides of the cooking surface to raise the temperature of said cooking surface to a level to vaporize the moisture contained in the said food portion and; to cause vapour to build up pressure and to raise the temperature of said cooking vessel/processing chamber to evenly cook the said food portion on all sides without supervision or labour.

According to an embodiment herein, the method of pressure baking a portion of food is further characterized in that said cooking liquid is mostly juices released from said food.

According to an embodiment herein, the method of pressure baking a portion of food is further characterized by the step of automatically controlling said heat so that it is applied to said cooking surface depending on the food being cooked.

According to an embodiment herein, the method of pressure baking a portion of food is further characterized by the step of venting out the steam to stop the cooking process.

According to an embodiment herein, the method of pressure baking a portion of food further comprises the steps of defining the cooking recipes by the (predetermined) number of steam vents out of the cooking machine/chamber. Irrespective of the cooking quantity that is cooked, the recipe will simply define the completion with the number of the steam venting that happens (or required). As an example, for preparing a specific dish, the recipe defines a completion of cooking after 3 steam releases when using the pressure baking concept in the pressurized cooking appliance.

According to an embodiment herein, a cooking appliance or system is provided for performing Cold Pressure Frying process in which the food is immersed in cold oil; and both the oil and the food are heated together under pressure.

According to an embodiment herein, a cooking appliance or system is provided for performing cold pressure frying process by combining the elements of both vacuum frying and cold frying processes thereby dramatically reducing oil absorption, and creating a crunchy shell and a buttery soft interior for starchy vegetables like banana, taro and yam.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
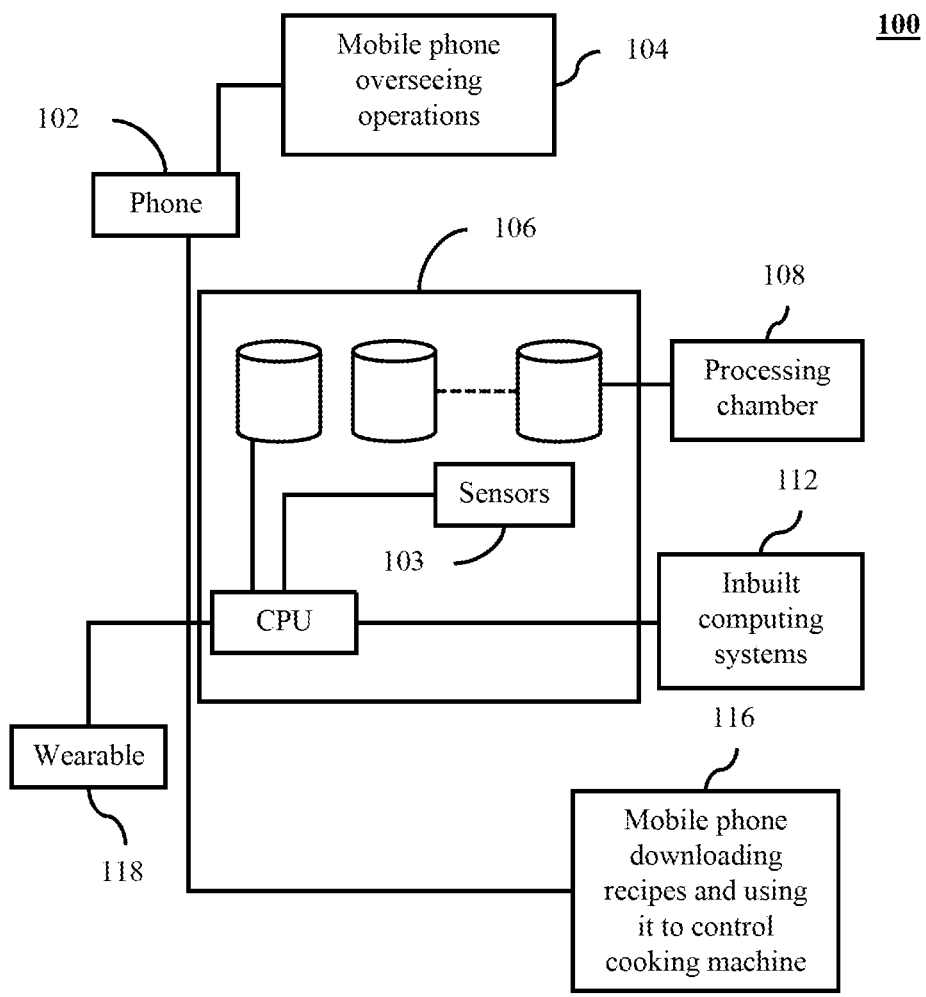
FIG. 1 illustrates a block diagram of an appliance environment, according to one embodiment herein.

Although the specific features of the embodiments herein are shown in some drawings and not in others. This is done for convenience only as each feature may be combined with any or all of the other features in accordance with the embodiment herein.

DETAILED DESCRIPTION OF THE EMBODIMENTS HEREIN

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system for automatic end-to-end preparation and management of food. The embodiments also provide a system to monitor food intake pattern of users and automatically prepare food based on diet needs of users.

According to an embodiment herein, an automatic food preparation and management system that is distributed across a plurality of geographic locations is provided. The system comprises a hardware processor, a memory module, an analytics module, a plurality of end-point devices, a cloud computing module, a communication module, a sensors module, an inventory management module, and a recipe and menu building module. The memory module comprises a plurality of connected digital data storage devices and comprises digital data of the automatic food preparation and management system. The analytics module is stored in the memory module. The end-point devices comprise kitchen appliances and food processing machines located in a plurality of geographical locations. The cloud computing module connects a plurality of remotely located end-point devices. The communication module enables communication between a plurality of end-point devices. The sensors module comprises a plurality of sensors connected to the analytics module, the cloud computing module and the communication module. The inventory management module is connected to the analytics module, the cloud computing module and the communication module. The recipe and menu building module is connected to the analytics module, the cloud computing module and the communication module.

According to an embodiment herein, an analytics module is run on the processor. The analytics module is configured to analyze the inputs from a plurality of sensors and end-point devices. The analytics module is further configured to decide the type of food to be prepared by the system based on the inputs from the plurality of sensors and end-point devices. The analytics module is configured to send instructions to the plurality of end-point devices through the communication module.

According to an embodiment herein, a plurality of end-point devices are provided. The plurality of end-point devices comprise kitchen appliances that are connected to the cloud computing module. The plurality of end point devices are configured to receive instructions from the analytics module for cooking food. All the end-point devices are configured to work independently and in coordination with other end-point devices.

According to an embodiment herein, the plurality of end-point devices are provided with add-on modules that enable the end-point devices to connect to the system through the cloud computing module.

According to an embodiment herein, the sensors module comprises a plurality of sensors that measure an availability of ingredients to cook food. The sensors module also comprises a plurality of sensors that measure the food and nutrition intake of a plurality of humans and provide the information about the food and nutrition intake to the cloud computing module.

According to an embodiment herein, the plurality of sensors comprise audio, visual and biometric sensors that are configured to communicate the sensor output to the cloud computing module.

According to an embodiment herein, an inventory management module is run on the hardware processor. The inventory management module is configured to manage the availability of a plurality of ingredients for preparation of food. The inventory management module is also configured to receive the information regarding an availability of ingredients in a plurality of storage locations through the sensors module. The inventory management module is configured to receive the information regarding a type of food the system is scheduled to cook and automatically alert the end-point devices about the availability of the ingredients.

According to an embodiment herein, the inventory management module is configured to order the ingredients through online e-commerce websites and specify the location to which the ingredients are to be delivered.

According to an embodiment herein, the recipe and menu building module is run on the hardware processor. The recipe and menu building module is configured to receive the information regarding a food intake pattern of a user, an amount of nutrients taken by the user and the vital health parameters of the user through a plurality of sensors that are remotely located and connected to the cloud computing module.

According to an embodiment herein, the recipe and menu building module is configured to receive the information about the availability of ingredients at the location of the users and prepare a personalized menu of food to be prepared for every user depending on the availability of ingredients and the health parameters of the user. The recipe and menu building module is configured to provide the recipe of the food to be prepared and the instructions of preparing the food to the end-point devices through the analytics module.

According to an embodiment herein, a cooking appliance or system is provided to obtain/achieve all of the culinary advantages associated with grilling, stir frying, cold frying, and pressure cooking.

According to an embodiment herein, a cooking appliance or system is provided to cook food rapidly with very less chances of burning, without the loss of texture, color or flavor.

According to an embodiment herein, a cooking appliance or system is provided to stop cooking at the right time, thereby ensuring even complete novices/semiskilled personnel to cook perfect food, without any skill.

According to an embodiment herein, this apparatus is a composition of device and cooking techniques aimed at automating cooking and ensuring food retains its shape, color, texture taste and nutrition. This apparatus lets even complete novices cook better than skilled chefs. The apparatus improves the current pressure cooking, microwaving and baking processes.

According to an embodiment herein, this apparatus is designed to cook food at the highest possible heat, for the lowest possible time with little or no water. One part of the heating happens under high pressure. Unlike conventional pressure cooking, the apparatus does not use water or an inner vessel as the high temperature needed is not produced with the presence of water or by the use of an inner vessel. The apparatus is designed to cook food in its own juices. So little or no water or oil is added, unlike traditional cooking where much higher quantity of water is added According to an embodiment herein, the apparatus is designed to cook under the highest possible pressure currently possible at the highest possible heat that is attained without burning, for the lowest possible time to ensure perfect cooking.

According to an embodiment herein, the apparatus is designed to work by cutting food into small pieces and ensuring that foods gets browned from the Maillard reaction, to infuse food with more flavor, unlike traditional pressure cookers where browning is not possible According to an embodiment herein, this apparatus causes food to be cooked at high heat in the beginning, enabling browning reactions to produce complex caramelized flavors, which is impossible to produce by pressure cooking, boiling or steaming.

According to an embodiment herein, this high heat soon causes the apparatus to fill up with steam—mostly produced from food's own juices. This steam is produced mostly from food's own juices. This apparatus ensures this steam buildup happens before food starts getting burnt. Once enough steam has been produced, pressurized baking starts and the temperature of the apparatus drops to prevent burning. As food is completely saturated by steam, all regions are at the same temperature. This eliminates the need for stirring—as all regions get heated evenly. The lack of water reduces agitation and minimizes structural damage of food. The apparatus causes the dry food to be enveloped in pressurized steam, which permeates food, cooking it instantly.

According to an embodiment herein, the apparatus behaves as a pressurized baking oven. The food now gets pressure baked. After a set time is reached, the excess steam is vented out to stop further cooking. This heightens color, texture and flavor. Cooking by any other cooking method like pressure cooking, baking, steaming, boiling or microwaving normally results in the loss of color of vegetables and fruits. Instead, this apparatus is designed to intensify inherent colors, textures and taste of food.

The fruits and vegetables have three kinds of coloring pigments. Chlorophyll—green pigment, Carotenoids—pigments ranging from yellow to deep red, and Flavonoids like anthocyanins—red, blue or purple pigments & anthoxanthin—white pigment. These are found in varying amounts depending on the stage of ripening. Chlorophyll is the green colour of the leaves. It is also present in fruits and vegetables like cabbage, broccoli, kiwi fruit and green apples. Chlorophyll is fat soluble and will be washed out during stir frying with oils. Chlorophyll is also affected by the length of cooking. When the chlorophyll containing vegetables are heated, the air trapped in the tissues escape first. This makes the vegetables bright green in colour initially. With this apparatus, cooking is stopped at this stage, so as to retain that bright colour. Cook is stopped to prevent chlorophyll getting cooked into less bright compounds like Pheophytins. This apparatus is designed to preserve colour by cooking for a short time with little or no oil. The carotenoid pigments are found in lemons, oranges, strawberries and in vegetables like capsicum & carrot. They are fat soluble and easily affected by oxidation. By using sealed cooking with little or no oil, with minimal contact with oxygen, this apparatus brightens up the carotenoid pigment color. The flavonoids (anthocyanins and anthoxanthins) present in brinjals, apples, onions, cauliflowers & potatoes are water soluble. This apparatus is designed to cook them with minimal exposure to water, thus brightening their existing color.

According to an embodiment herein, this apparatus is so designed that the interface maintained between the hot cooking surface and the food vaporizes to form steam that exerts pressure against the food and thus more rapidly transfer heat thereto for assisting in cooking the interior portions thereof, and the heated steam in which the food is immersed assists in cooking the exterior surface of the food while acting to contain flavor elements that tend to escape from food during cooking. Thus, the food is "pressure baked" very quickly and generally evenly without burning and with a minimum of colour loss, texture loss and flavor loss. The shape of food is also maintained perfectly.

According to an embodiment herein, the shape of the cooking surface is designed to maximise heat transfer to food and minimise burning.

According to an embodiment herein, the preferred apparatus includes a pressurised cooking vessel/processing chamber with a dimpled bottom to hold a minimal quantity of water to prevent burning, a valve which rises up to indicate pressure has been built and a release valve which is used to release steam after cooking is completed. The heating element is located underneath and can be mechanically or automatically controlled. the heating element can be gas, induction, electrical hotplate or a wide variety of other ways of heating. The heating is controlled manually or automatically through a remote device such as a cellular phone.

According to an embodiment herein, a method of pressure baking a portion of food, comprising the steps of providing a sealed, pressurised cooking vessel/processing chamber; cooking said food portion at high heat in its own juices at high pressure for a short duration; causing said compressed food portion to be heated up very fast, so as to produce enough steam to pressurise the cooking chamber; applying external heat directly to the bottom and sides of the cooking surface to raise the temperature of said cooking surface to a level to vaporize the moisture contained in the said food portion and; to cause vapour to build up pressure and to raise the temperature of said cooking vessel/processing chamber to evenly cook the said food portion on all sides without supervision or labour.

According to an embodiment herein, the method of pressure baking a portion of food is further characterized in that said cooking liquid is mostly juices released from said food.

According to an embodiment herein, the method of pressure baking a portion of food is further characterized by the step of automatically controlling said heat so that it is applied to said cooking surface depending on the food being cooked.

According to an embodiment herein, the method of pressure baking a portion of food is further characterized by the step of venting out the steam to stop the cooking process.

According to an embodiment herein, the method of pressure baking a portion of food further comprises the steps of defining the cooking recipes by the (predetermined) number of steam vents out of the cooking machine/chamber. Irrespective of the cooking quantity that is cooked, the recipe will simply define the completion with the number of the steam venting that happens (or required). As an example, for preparing a specific dish, the recipe defines a completion of cooking after 3 steam releases when using the pressure baking concept in the pressurized cooking appliance.

An automatic food preparation and management system that is distributed across a plurality of geographic locations, the system comprises a hardware processor; a memory module, wherein the memory module comprises a plurality of digital data storage devices for storing digital data for automatic food preparation and management; an analytics module, wherein the analytics module is stored in the memory module; a plurality of end-point devices, wherein the plurality of end-point devices comprise kitchen appliances and food processing machines located in a plurality of geographical locations, and wherein the plurality of end-point devices comprise kitchen appliances that are connected to the cloud computing module, and wherein the plurality of end point devices are configured to receive a plurality of instructions from the analytics module and cook-food, and wherein the kitchen appliance has a plurality of processing chambers, and wherein the plurality of processing chambers are configured to allow process the ingredients to be processed perform heating, boiling, cooling, spraying, baking, cooking, pressure baking, cold frying, cleaning, dish washing operations, and moved the ingredients from one chamber to next, based on conditions, and wherein the conditions include time, input from a plurality of sensors in a sensor module, and wherein all the end-point devices are configured to work independently and in coordination with other end-point devices, and the kitchen appliance has a user-interface where the user is enabled to order for what he wants, and wherein the kitchen machine enables the user to browse through all the items that are to be cooked out of the available ingredients during the ordering process, and wherein the kitchen appliance has machine a configurator to decide on what is to be cooked accommodating constraints that include Quantity required, Ingredients available, Time available, and Storage required, wherein the kitchen appliance has a camera and biometric capabilities to identify a user to recognizes his preferences in suggesting items; a cloud computing module, wherein the cloud computing module connects the plurality of end-point devices, and wherein the system enables gifting recipes or items so that a mom is enabled to gift a special cake by picking a recipe (or creating it) and pushing it to the target ID of his son who lives several thousand kilometers away, and wherein the system even enables mom to pay for the ingredients that is ordered by the machine to cook the item she forwarded thereby enabling a to send the cooked food remotely, and wherein the cloud computing module helps in supporting models thereby enabling a restaurant to order or replenish the used ingredients by covering the cost of ordering them to the machine, which is batched/grouped in batches; a communication module, wherein the communication module is configured to establish communication between the plurality of end-point devices; a plurality of sensors connected to the analytics module, the cloud computing module and the communication module; an inventory management module, wherein the inventory management module is connected to the analytics module, the cloud computing module and the communication module, and wherein the inventory management module keeps record of a perishable time either from its internal database or from the input from the store, and wherein the inventory management module is configured to dispose a perishable item and place an order based on a record of time; and a recipe and menu building module, wherein the recipe and menu building module is connected to the analytics module, the cloud computing module and the communication module, and wherein the recipe and menu building module is run on the hardware processor, and wherein the recipe and menu building module is configured to receive an information related to a food intake pattern of a user, an amount of nutrients taken by the user and a plurality of vital health parameters of the user through the plurality of sensors that are remotely located and connected to the cloud computing module; and a Cooking Initiation module configured to receives inputs from a historical information module and a Live information module, and wherein Historical Information module comprises information comprising Ingredient Properties, Recipe Properties. Results of Cooking Process and Effects of Storage, and wherein Live Information module comprises information from plurality of live processes comprising Optical Inspection. Thermal Inspection, vapour Analysis, Texture Analysis, Conduction, Endoscopy and Chemical Reactive test of small sample.

According to an embodiment herein, the analytics module is run on the processor, and wherein the analytics module is configured to analyse the inputs from the plurality of sensors and the plurality of end-point devices, and wherein the analytics module is configured to decide the type of food to be prepared by the system based on the inputs from the plurality of sensors and the plurality of end-point devices.

According to an embodiment herein, the analytics module is configured to send a plurality of instructions to the plurality of end-point devices through the communication module.

According to an embodiment herein, the plurality of end-point devices are provided with add-on modules that are configured to connect the plurality of end-point devices to the system through the cloud computing module.

According to an embodiment herein, the sensors module comprises the plurality of sensors that are configured to measure an availability of a plurality of ingredients required to cook food, and wherein the sensors module also comprises the plurality of sensors for measuring the food and nutrition intake of a plurality of humans and to provide the information regarding the food and nutrition intake to a processing module and the cloud computing module.

According to an embodiment herein, the plurality of sensors comprises audio, visual and biometric sensors that are configured to communicate the sensor output to the cloud computing module.

According to an embodiment herein, wherein the inventory management module is run on the hardware processor, and wherein the inventory management module is configured to manage or control and regulate an availability of a plurality of ingredients required for a preparation of food, and wherein the inventory management module is configured to receive an information about the availability of the plurality of ingredients in a plurality of storage locations through the sensors module, and wherein the inventory management module is configured to receive an information related to a type of food scheduled to be cooked by the system, and wherein the inventory management module is configured to automatically alert the plurality of end-point devices regarding the availability of the plurality of ingredients.

According to an embodiment herein, the inventory management module is configured to place an order for purchasing a plurality of ingredients through online e-commerce websites and notify a location for delivery of the plurality of ingredients purchased.

According to an embodiment herein, the recipe and menu building module is configured to receive an information regarding an availability of a plurality of ingredients at a location of the users, and wherein the recipe and menu building module is configured to prepare a personalized menu of food for every user depending on the availability of the plurality of ingredients and a plurality of health parameters of a user, and wherein the recipe and menu building module is configured to provide a recipe of a food to be prepared and a plurality of instructions for preparing the food to the plurality of end-point devices through the analytics module.

According to an embodiment herein, a system and method for Pressure Baking (Earlier called Flash Cooking) are provided. Pressure Baking is an OPOS technique of cooking food in its own juices at the highest possible heat for the lowest possible time. This produces dramatic results. It heightens flavors, colors, textures, tastes and promises greater nutrition. It is just too good to be true. Techniques like stir frying, tandoori cooking, barbecuing and grilling rely on the same principle, but they all need an expert. Pressure Baking deskills this type of cooking, without requiring a skilled personnel.

According to an embodiment herein, Pressure cooking of food in its own juices, without water, without using an inner vessel and over the highest possible heat, for the shortest possible time comprises the following process in steps. In Step 1, a right sized pot (2 L and 3 L) is selected/chosen and the inner vessel is eliminated/removed. The high temperature and ultra-short cooking times needed for Pressure Baking is not produced in a larger pot or with an inner vessel. In step 2, Pressure Baking is performed with no-water cooking and pressure baking requires little or no water. In Step 3, pressure cooking is performed at the highest heat by heating the cooking vessel under high heat for preset time period. t. Normal pressure cookers are not designed to be used without water or over high heat. A cookware, (magic pot) is especially designed for high heat, no water cooking that meets the requirement of a Pressure Baking demands. In Step 4, the pressure is released immediately after heating the cooking vessel/chamber to stop cooking.

According to an embodiment herein, Pressure Baking simulates and deskills stir frying. The pressure baking of food, produces the following actions/reactions. In the step-1, the food items/vegetables are loaded into a pressure chamber/cooker, after cutting Food items into thin bits and wherein the cut food items are loaded inside the pressure cooker/chamber in a particular order, starting with a buffering process involving addition of usually oil/water or a combination of both, as thick chunks/bulk pieces are not to be pressure baked. In step-2, the loaded food is heated food at the highest possible heat, in this process, the food is roasted till the pressure builds up, and finally the food gets roasted, producing complex flavors unlike boiled or steamed food. In step-3, the Steam is built-up inside the pressure chamber/cooker, thereby making the pot (pressure chamber/cooker) to fill up with steam produced from food's own juices due to high heat applied to the pressure chamber/cooker. As one part of water becomes 1700 parts of steam, very little water is required to build up pressure. This steam buildup happens as fast as possible, to prevent the food getting burnt. In step-4, the steam inside the pressure chamber is saturated. As the steam saturates the pot, the temperature drops (because the steam is at around 120 degrees, not as hot as the bottom surface of the cooker). The roasting action is minimised and pressure steaming begins. All regions are at the same temperature and get heated evenly, unlike stir-frying, where the bottom is heated more than the top. In step-5, the food is completely enveloped in pressurized steam. This hot steam permeates through the food, thereby cooking the food instantly. Now, the conditions inside the pot perfectly replicate the conditions inside an oven, with an important difference. This cooking condition is replicated in all geographical locations anywhere across the world, whether it is on a mountain top or in a submarine thereby performing pressure cooking without depending on the atmospheric pressure level at any given location. The temperature difference caused by atmospheric pressure ceases to matter. The absence of water ensures over 5 times as much heat is transferred to food as compared to pressure cooking. This is the key reason why Pressure Baking is ultra-fast and makes food come alive. In step-6, the pressure inside the cooking chamber/vessel/pot/cooker is quickly released, after the food is cooked, and any further heating is stopped immediately. Even after the heat is turned off, the pressurised steam continues to cook food. This steam is released manually to prevent the steam from overcooking food. Each second matters as overcooking makes food lose its color, texture and flavor. In step-7, the cooked food and the pot still retain heat. This heat continues to cook food and again causes overcooking. This heat needs to be removed by transferring the contents to a colder vessel. All these steps are performed in the given/pre-set order specified for performing Pressure Baking operation.

According to an exemplary/preferred embodiment herein, a first layer of two table-spoons (tsp) of oil is provided in a pressure/chamber/cooker. Then a second layer of chopped beans is added to the pressure chamber/cooker. a third Layer of chopped green chilli(es), and ¼ tsp of salt is added to the cooking pot/pressure chamber/pressure cooker. The cooking pot/pressure chamber/pressure cooker is heated on high heat for preset time, which is as minimum as possible, depending on the type and nature of food. After heating for preset time, the heating is stopped and the pressure inside the cooking pot/pressure chamber/pressure cooker is released forcefully/manually. The food items/contents inside the cooking pot/pressure chamber/pressure cooker is mixed thoroughly.

This pressure baking process is performed/applicable over a huge range of recipes across cuisines from appetizers to desserts. The advantages of the pressure baking process are as follows. Pressure Bake of veggies/meat produces dry curries. Pressure Baked vegetables are blended into soups or mashed into subzi. Pressure Baked foods are mixed in a liquid to make gravies. Pressure Bake of vegetables with processed starch (poha, bulgur, couscous, oats etc.) are performed to obtain a meal. Pressure Baking of non-watery vegetables/meats/seafood are mixed with cheese or a dip to get appetizers. Pressure Baking of fruits and vegetables with sugar enables to make halwas/jams. Pressure Baking of vegetables/meats with a spice paste enables to obtain an innumerable gravy, across cuisines. Pressure Baking of rice/pasta/noodles sandwiched between vegetables/meats is performed to obtain no-water biriyanis/pasta/noodles. Pressure Baked eggs are layered over vegetables/meats. Pressure Baking of dais without water is possible after soaking them overnight. The bright colors, firm textures and clean flavors of Pressure Baked vegetables appealed to the people to heighten their senses.

According to an embodiment herein, a cooking appliance or system is provided for performing Cold Pressure Frying process in which the food is immersed in cold oil; and both the oil and the food are heated together under pressure.

According to an embodiment herein, a cooking appliance or system is provided for performing cold pressure flying process by combining the elements of both vacuum frying and cold frying processes thereby dramatically reducing oil absorption, and creating a crunchy shell and a buttery soft interior for starchy vegetables like banana, taro and yam.

According to an embodiment herein, the cold pressure frying process has the following advantages and characteristics. Most of the foods contains majority of water content. Potato, for instance, has 80% water. When food is dropped into hot oil, this water becomes steam. The pathways between cells once filled with water are now pressurized with steam (at around 6 PSI). As long as the heating continues, steam keeps building up. The density drops and they start to float. When they are taken out, and left to cool, the steam pressure drops. The pathways are open. Oil gets sucked in by capillary action (like what happens when you suck through a straw). More oil is absorbed during cooling period than during frying period. Hence the density is increased. Higher temperatures open up more pathways, leading to more oil absorption.

In the Cold Pressure Frying process, the frying temperature range is around 120-170 C; oil absorption is less than 20 percent; there is little or no Acrylamide formation; natural color and flavors are preserved better; there is zero oil smoke generation, no grime/gunk is formed in the kitchen; no exhaust/chimney is needed; there is little or no formation of Free radicals; oxidation is greatly minimized; Greater shelf life is maintained; cold pressed oils are possibly used for frying; oils remain clear even after multiple uses; oils are reused over a dozen times; possible to perform cold pressure frying process with even unskilled/semiskilled personnel efficiently; Zero splatter; lesser fuel consumption; and more juicier output.

FIG. 1 is a schematic illustrating multiple levels of barrel architecture. According to an embodiment herein, the figure illustrates high-level parts of the system and the interaction of the system with internal and external peer systems.

The first level has the raw ingredients whereas the last level has the ready to consume food. The intermediate levels have food, which is being processed or stored. Each of these barrels have sensors, which report on the temperature, quantity, weight, texture, and the like. These barrels dispense content or go into processing chambers. The processing chambers perform a variety of operations like cleaning, boiling, deep-frying, cold frying, pressure baking, spraying, fermenting, refrigerating, reheating, mixing, and the like.

There are also special purpose chambers that are used for sensing the quality or quantity of the operation such as a visual camera inspection chamber, which is configured to see the food to decide on the next course of action.

This whole set of chambers are controlled by programs. A typical example of the program is as follows: Take 200 grams of Rice cereal (Step 1), Mix with 200 ml of water (Step 2), Boil for 6 minutes in a cooker at 100 degree C. (Step 3), Check if the pressure has reached 100 units (Step 4), Store this for a while in a bin (Step 5), Take 4 pieces of tomatoes or 100 grams whichever is higher (Step 6), Cut the tomato into slices (Step 7), Fry the tomatoes in a vessel and hold in a bin (Step 8), Take 2 pieces of chilly or 10 grams (Step 9), Cut the chilly into minced paste (Step 10), Spray 5 grams of salt (Step 11), Spray 5 grams of pepper (Step 12), Mix this with the bin containing tomatoes (Step 13). Fry again for 5 minutes (Step 14), Mix this with the bin containing the rice (Step 15), Slowly heat the mixture for 15 minutes with a mixing operation at 80 degree C. (Step 16), Visually check if the mixing is fine (Step 17). Assess the ingredients to get the level of calories, fat sugar by taking a small sample (Step 18), Redo any procedure to reach to perfect proposition (Step 19), Store for up to 3 hours in low heat 50 degrees (Step 20) and if beyond 3 hours term the food to be inedible (Step 21).

The machine is capable of identifying the parallel paths and perform the cooking operation faster.

The machine is configured to convert these into operations involving barrels and chambers as follows:

According to an embodiment herein, the Step 1 is broken Down Into, Load Barrel B41 (Containing rice) (Step 1a), Move B41 to operation chamber OC10 in the input side, which is configured to dispense the right quantity (Step 1b), Load empty Intermediate Processing Barrel IPB1 (Step 1c). Move IPB1 to OC2, which is configured to wash it (Step 1d), Move IPB1 to OC1, which is configured to visually check for cleanliness (Step 1e), Move IPB1 to the output side of the OC10 (Step 1f), Perform the operation on OC10 to dispense 200 grams (Step 1g), and Verify weight with load cell on OC10 if available (Step 1h).

According to an embodiment herein, the Step 2 is broken down into Load Barrel B1 (Containing water) (Step 2a), Move OC11 chamber into CC1, which is chamber for cleaning operation chambers (Step 2b), Perform cleaning operation on CC11 (Step 2c), Move B1 to operation chamber OC11 in the input side, which is configured to dispense the right quantity of liquids (Step 2d), Move IPB1 to the output side of the OC11 (Step 2e), and Perform the operation on OC10 to dispense 200 ml (Step 2f).

According to an embodiment herein, the step 3 is broken down into Move OC12 chamber (which is for boiling) into CC1, which is chamber for cleaning operation chambers (Step 3a), Perform cleaning operation on CC12 (Step 3b), Move IPB1 into CC12 (Step 3c), and Perform the operation of boiling at set temperature for 6 minutes (Step 3d).

The above is just few steps being elaborated, essentially the machine is configured to break down the operation into the processing steps using intermediate barrels, storing barrels and processing chambers.

With respect to FIG. 1, the system includes the cooking machine 106, the processing chambers 108, the sensors 103, the mobile phone 102, the wearable device 118, and the inbuilt computing device 112.

According to an embodiment herein, the cooking machine 106 has multiple processing chambers. The processing chambers 108 allow the ingredients to be processed, moved from one chamber to the next, based on conditions such as time, input from sensors. Multiple chambers are required if the preparation is staged. Further, the sensors 103 assist the machine to determine one or more of the following features of the material in the chambers—colour, temperature, texture, liquidity, solidity, weight, permeability, viscosity, pressure, etc.

According to an embodiment herein, the mobile phone 102 through an application for cooking machine controls the machine, both as a user and as a programmer. In a low-end machine, where the computing power is limited, the mobile phone 102 stores all the recipe information and send only processed instructions to the cooking machine. Further, the user has an option to use another computing device such as a watch to monitor the status of the device.

According to an embodiment herein, the processing power on the machine allows it to communicate with external world, devices and control the preparation of the food according to the inputs of the user. In some cases, this processing power is leveraged from phone where the recipe management logic sits on the phone and only machine has limited capabilities to execute the processing instructions from the phone.

The system is configured to also order whenever the barrels run out of items. It is configured to queue items and intelligently order once in preferred batches.

According to one embodiment herein, the system is provided or fitted with an outside/external facing portion for replenishing the ingredients and also for external cleaning.

Figure 2:
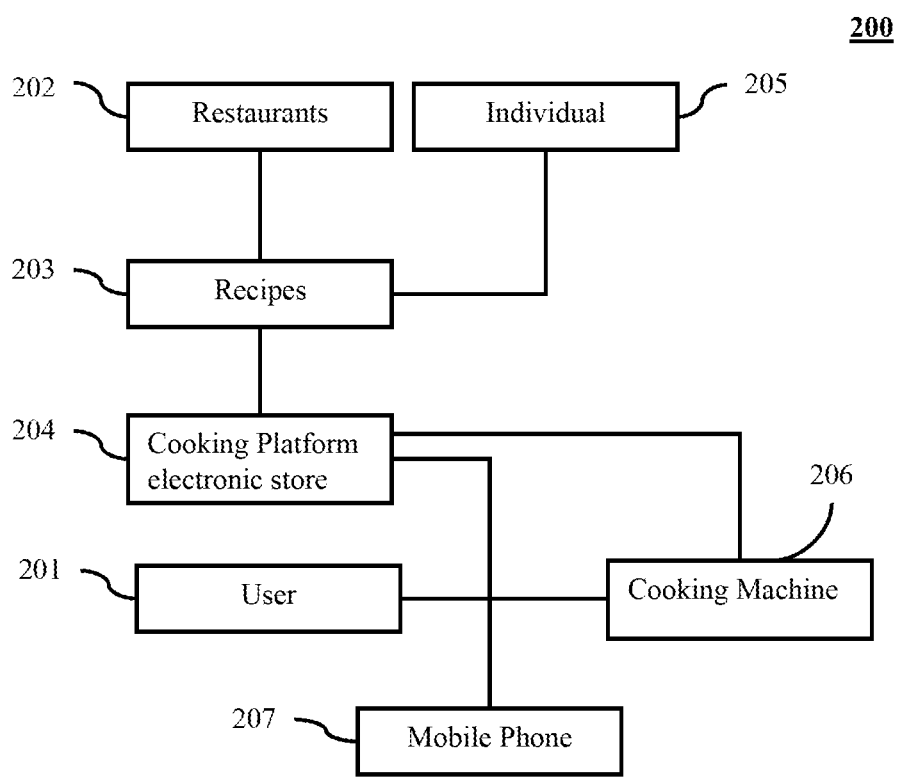
FIG. 2 illustrates a block diagram of a mobile phone and the interface on the cooking machine to choose the recipe, according to an embodiment herein.

FIG. 2 illustrates a block diagram representing the usage of a mobile phone and the interface on the cooking machine to choose the recipe, according to an embodiment herein.

According to an embodiment herein, the recipes are chosen from an e-store, and the dish is prepared on the machine automatically. The interface to the machine (on the machine or on phone) allows user to select the recipes that are compatible to his machine and gives the user a choice of selecting recipes that are prepared within constraints.

As illustrated in FIG. 1, there are multiple processing chambers. Each processing chamber is configured to apply a particular effect on the preparation such as heating, cooling, microwaving, etc. According to the programmed instructions, the contents from different cartridges are unloaded into the vessels and the vessel with the contents goes through different chambers during the cooking process. There are finite number of vessels and each of the vessel is configured to advertise its capabilities to the master controller.

According to an embodiment herein, the system is configured to capture the aspect of using data from various wearable devices that user uses and the wearable devices are configured to capture data such as ECG, BP, blood sugar level, stress level, oxygen saturation level mood, etc., and use this for making selection of the food items. For example, when BP is higher, a recipe with lesser salt is chosen for preparing food for the user.

With respect to FIG. 2, the block diagram includes the restaurant 202 that has an e-store on cooking machine commerce platform. The recipes 203 are set of instructions for preparing the food item, pre-requisite list of ingredients, constraints such as time, machine features required, version of software, along with user understandable description and pricing which is free or paid.

The block diagram further includes the electronic store platform 204 that allows not only restaurants but also even individuals to publish cooking recipes. This platform allows the users to have unlimited access to the free recipes, whereas controlled access to the paid ones. The control is either time limited subscriptions or per-use or per-store exclusive access or per-family subscriptions, etc.

A plurality of individuals 205 also collaborate on the platform to create the recipe together and share the credits both fame and monetary aspects. These are created in the programming mode of cooking machine, where users define each step that the machine has to take.

According to an embodiment herein, the cooking machine 206 is directly connected to the platform via internet/other network mediums, or connected via the mobile phone, where the phone acts as the gateway storing the recipe information. The mobile phone 207 has an app, which connects to the e-store and downloads the catalogue of recipes, allows users to access free recipes and purchase subscription to paid recipes. Mobile phone app is configured to also store the recipes, without burdening the cooking machine if chosen by the user.

Figure 3:
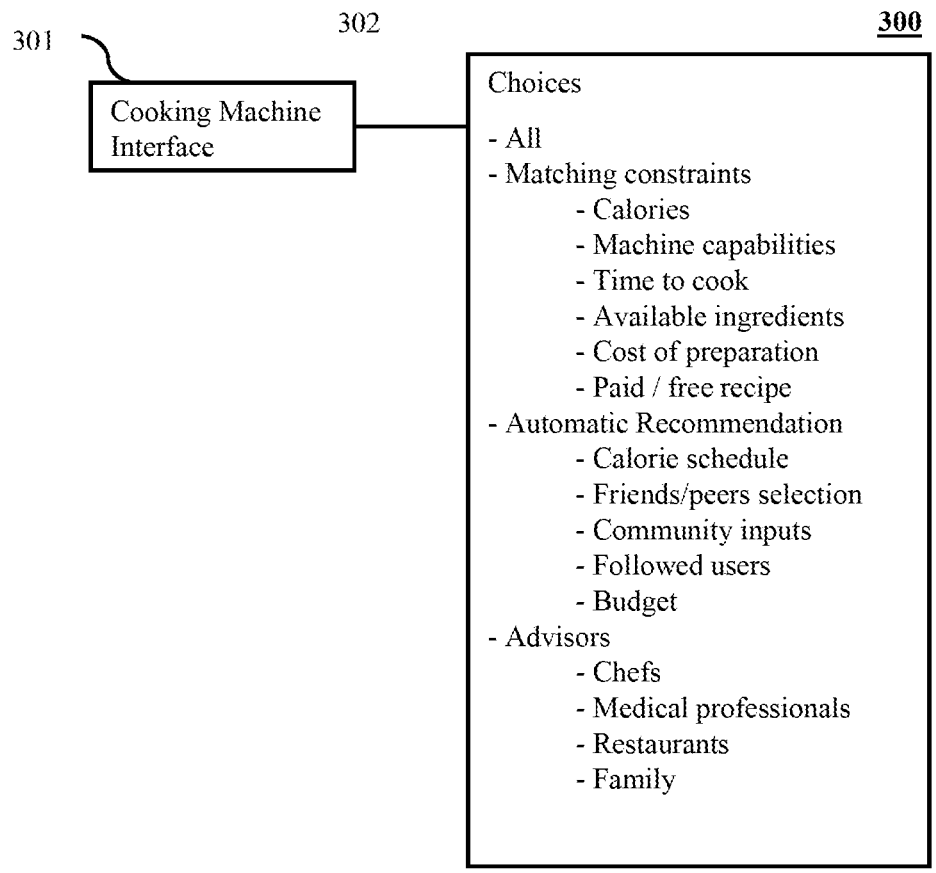
FIG. 3 illustrates a block diagram of a user interface for selecting an item for preparation, according to an embodiment herein.

FIG. 3 illustrates selection of an item for preparation, according to an embodiment herein. The user 301 who access the cooking machine interface via the mobile app or by using the interface available on the machine. A user also allows the machine to auto choose based on the constraints in 302. The user of the cooking machine 302 has an interface to choose the recipes to be prepared on his appliance. This interface allows him to choose a recipe, based on several categories such, but not limited to the ones listed in 302. According to an embodiment of herein, the user has the option of choosing it free from the overall list available to his machine. User also searches for the ones he is looking for based on all recipe metadata.

According to an embodiment herein, the matching constraints allows user to filter down to a small subset so that the user is enabled to choose. Further, the automatic recommendation allows user to auto-select or narrow down to a very small subset based on recommendation from platform. This relies on profile data of the user on the cloud along with his social information and/or medical information. According to an embodiment herein, the advisors are a set of users who is enabled to manage the diet plan of the user by controlling the choice. These advisors optionally charge the user a subscription free. For example, a dietician is enabled to manage all the recommendations suiting the medical profile of a user.

Figure 4:
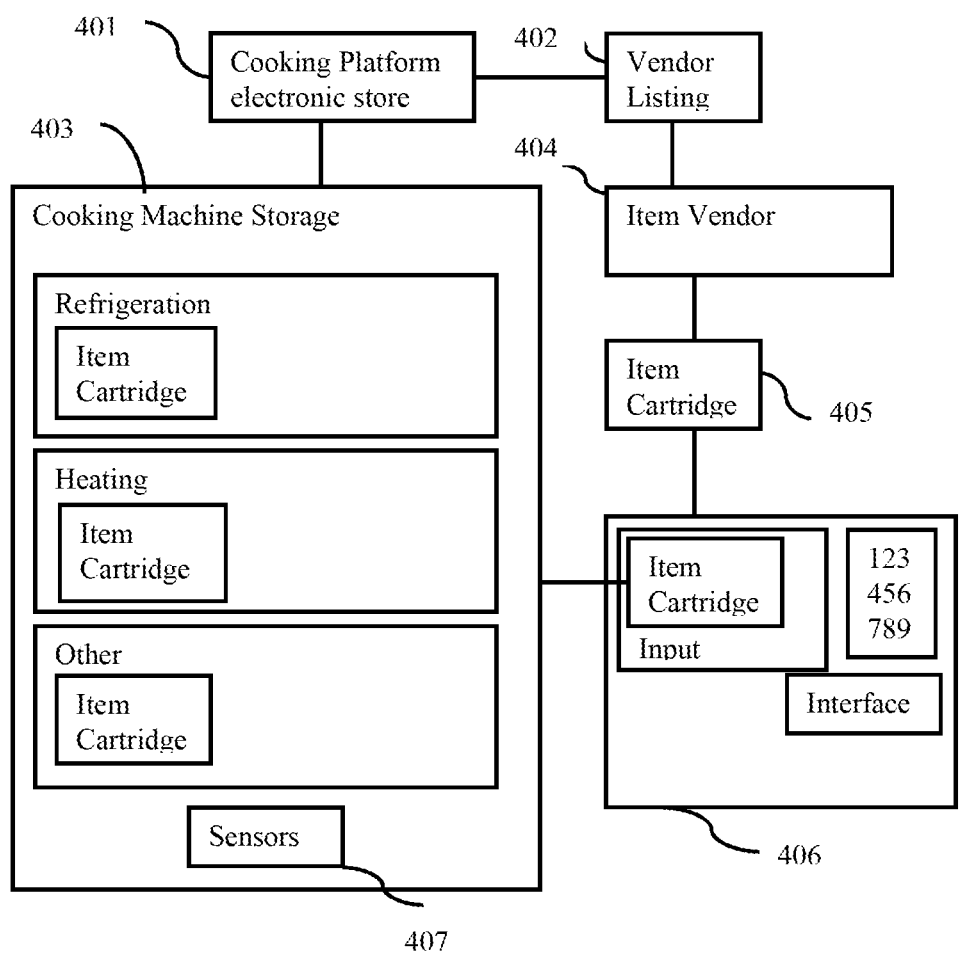
FIG. 4 illustrates block diagram of a system for taking the inventory and maintaining inventory for food preparation, according to an embodiment herein.

FIG. 4 illustrates ordering the inventory and maintaining inventory for food preparation, according to an embodiment herein. The 406 depicts the external facing side of the cooking machine that is configured to be accessed from outside the house/office. According to an embodiment herein, the user has an option to override the process of automatic ordering via manually procuring and feeding the content and information associated with the content.

According to an embodiment herein, the ingredient storage system 403 enables machine to order, store and dispose the ingredients based on the requirement and the condition of the ingredients. Each ingredient storage conditions and instructions to store is understood from the cloud and information available from the vendor such as days since packed, best before use, etc. Based on the prescribed instructions moves the content to different areas to maintain them at appropriate condition such as temperature.

According to an embodiment herein, the vendor 404 supplies the ingredients required for food preparation. He ships the items in a cartridge that is automatically inserted and understood by the system. In some cases, the vendor also physically transports these contents and feeds them into the external facing side of the cooking machine so that no user intervention is required.

Further, the vendor lists the availability of ingredients 402 with details including cost, time to ship, cost of shipping, packing date, expiry date, condition, colour, and the like. This allows the machine to order automatically or through the user intervention.

The cooking app 401 store platform enables the machine to order the items through the vendor listings available. The machine chooses the best option or based on user preferences considering all the parameters, based on forecast of required items vs availability. The platform is also configured to manage the payments involved in the ordering. According to an embodiment herein, the cooking machine 406 is configured to optionally have an external facing side in addition to or instead of internal ingredient feeding system. This allows vendors to re-fill or replenish the contents without user intervention. The external interface is also configured to have user inputs or other interfaces to authenticate, verify and validate the supplied ingredients.

According to an embodiment herein, the sensors 407 are used for determining the condition, quantity, quality of the ingredients stored and purchased to see if it meets the usage condition. If it is deemed unusable, it is ejected through the waste output section.

According to an embodiment herein, the machine has several compartments maintained at different conditions. As illustrated in the FIG. 4, there are several cartridges inside each of these compartments. These cartridges contain the food items. The vendors are enabled to deliver these cartridges using the external facing area described in the structure of the cooking machine.

The level of the ingredients is measured using a combination of inputs from Electronic weighing scale based on load cells and Image analysis. For conducting an image analysis, the system has camera module or the mobile phone or computing system has camera to take/capture the snapshots of the current contents and extract features such as filled vs empty also using historical knowledge of patterns when the contents is at different level.

Figure 5:
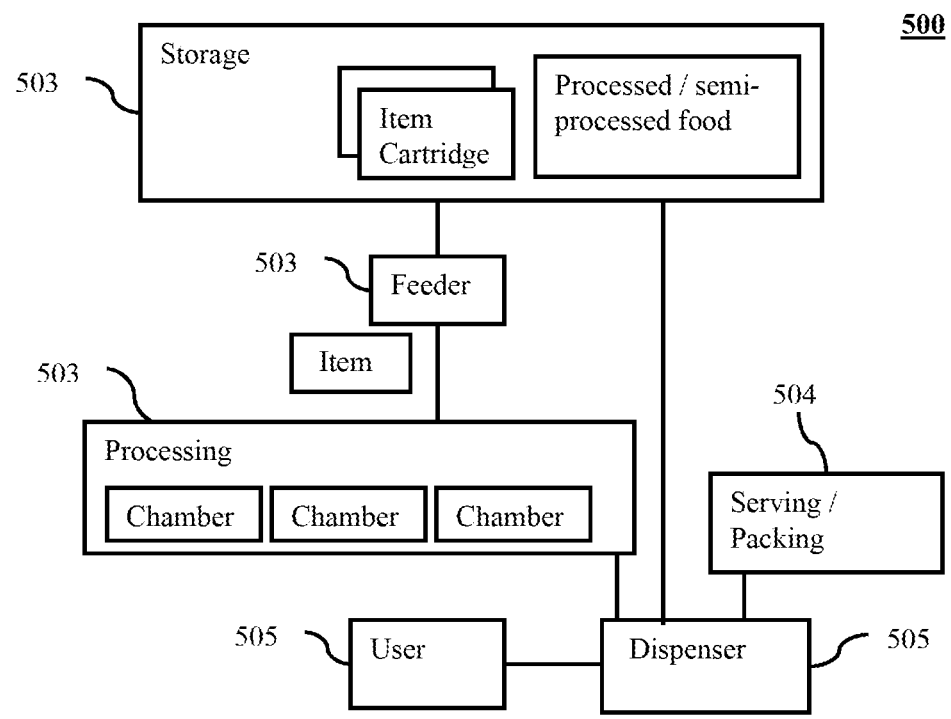
FIG. 5 illustrates a block diagram of a pre-processing system for the ingredients before preparing the food, according to an embodiment herein.

FIG. 5 illustrates the pre-processing of the ingredients before preparing the food, according to an embodiment herein.

According to an embodiment herein, the present the storage section 501 of the cooking machine is responsible for maintaining ingredients as well as semi-processed food and processed food in the specific conditions required and for moving the usable things to trash.

According to an embodiment herein, the feeder 502 moves the required items as per the instruction of the computing system, a specific quantity into a vessel that is moved across the preparation chambers. This method is also inverted by moving the preparation chambers around the food item in a vessel.

The preparation chambers 503 allow items to be prepared by supporting a specific type(s) of preparations on the item. For example, heating, boiling, cooling, spraying, microwave, baking, cooking, even cleaning, dish washing, etc.

The dispenser 506 dispenses the food after the preparation, either in the packed form or in a form where it is consumed immediately. According to an embodiment herein, the dispenser takes care of the presentation, branding, etc. The dispensing of packaged food also helps in deploying the cooking machine in public places, where it is a shared kitchen for many or even deployed in restaurants.

The user 505 who has ordered the food in the machine. A user is a personal owner of the machine or a user authorised on a shared machine or a customer of a food outlet.

The compartments 504 store the plates, cups, boxes for dispensing. According to an embodiment herein, the compartments 504 are operated manually or automatically by leveraging on the platform electronic store, where vendor replenishes this.

The system is configured to also assess the market conditions, such as ordering on a weekday through an online system is more economical, so the system is configured to batch and queue and order at the appropriate time.

The system also has provision with a small opening, which is even exposed, outside the house. This enables electronic store vendor to bring the items that the machine ordered and load into the system. He authenticates himself (Step 1), Provides the order details (Step 2), Feeds in the ingredient code that was provided by the machine during ordering (Step 3), and The machine brings in a barrel or a feeder to the barrel, which is configured to accept the ingredient (Step 4).

The ingredient is loaded in formats of a cartridge, for example, minced meat cartridge, is a cartridge of water, or emptied as it is inserted into the feeder. For example, inserting five tomatoes. In all of these steps, the machine keeps record of the perishable time either from its internal database or from the input from the store. For example, if the tomatoes, are able to last for 3 days, the machine disposes them and plans on reordering based on the knowledge. Intermediate visual inspections and even smell and texture based inspects are carried out by the machine.

During idle condition, the machine recognizes the type of storage of each of the ingredient and makes use of the appropriate chambers to achieve the same. For e.g. tomatoes if needed to be stored at 15 degree C., moves the barrel into refrigerator, which is enabled to keep it at 15° C. In some cases, the machine also decides to use the refrigerator for handling multiple tasks, such as first move the barrel with tomatoes, achieve temperature of 12.5, then move it out, bring in a barrel of say carrot, bring it to 12.5 degrees, and move these barrels out. Wait until temperature hits 16 again and redo the operation.

The machine is connected and not connected to a common network. If it is connected, the system is configured to take advantage of the data and information in the other machines. The central authority as in FIG. 4 is configured to moderate these.

The machine has a user interface where the user is enabled to order for what he wants. During the ordering process, the machine lets him browse through all the items that are to be cooked out of the available ingredients. The machine uses a configurator to decide on what is to be cooked accommodating constraints such as Quantity required, Ingredients available, Time available, Storage required etc.

This selection is not only be done using the system display but also done on a remote unit such as a mobile phone or a PC, which relays this information to the cooking machine.

The cooking machine also has a camera and biometric capabilities to identify a user so that it recognizes his preferences in suggesting the items. Apart from selecting from preloaded recipes, the system is configured to download recipes, which is offered in paid form or free by the peer cloud or the central communication platform.

The system also permits gifting recipes or items. For e.g. mom gifts a special cake by picking a recipe (or creating it) and pushing it to the target ID of his son who lives several thousand kilometers away. In the gifting process, the system even allows mom to pay for the ingredients that is ordered by the machine to cook the item she forwarded. This way it is remotely possible to send the cooked food.

The system uses the same model for even restaurants which is in virtually in the cloud. If a user orders five roti and one dhal curry to the restaurant using the virtual menu card, they use the ingredients in the machine and their unique recipe and make the dish.

The cloud platform even helps in supporting models where the restaurant is able to order or replenish the used ingredients by covering the cost of ordering them to the machine, which is batched/grouped in batches.

The system is configured to understand the health condition of the user and suggest menus for the user. This is applicable for one menu or a menu for a period.

The machine is equipped with sensors to measure body content such as water, fat, sugar, and the like, and even decide on the right food items.

The machine is equipped with technologies to even assist in location so that the delivery mechanisms for external suppliers are accomplished.

The same cooking machine is also called as a Cooking (Ro) Bot and applications used not only in home but also even in office or in public areas.

One of the features that are interesting in a many user scenario is the ability for the machine to account for the ingredients used for one cooking cycle or even for a month. For e.g. the machine is configured to maintain a statement of account for each employee of the ingredients used based on the ordering carried out by them.

Figure 6:
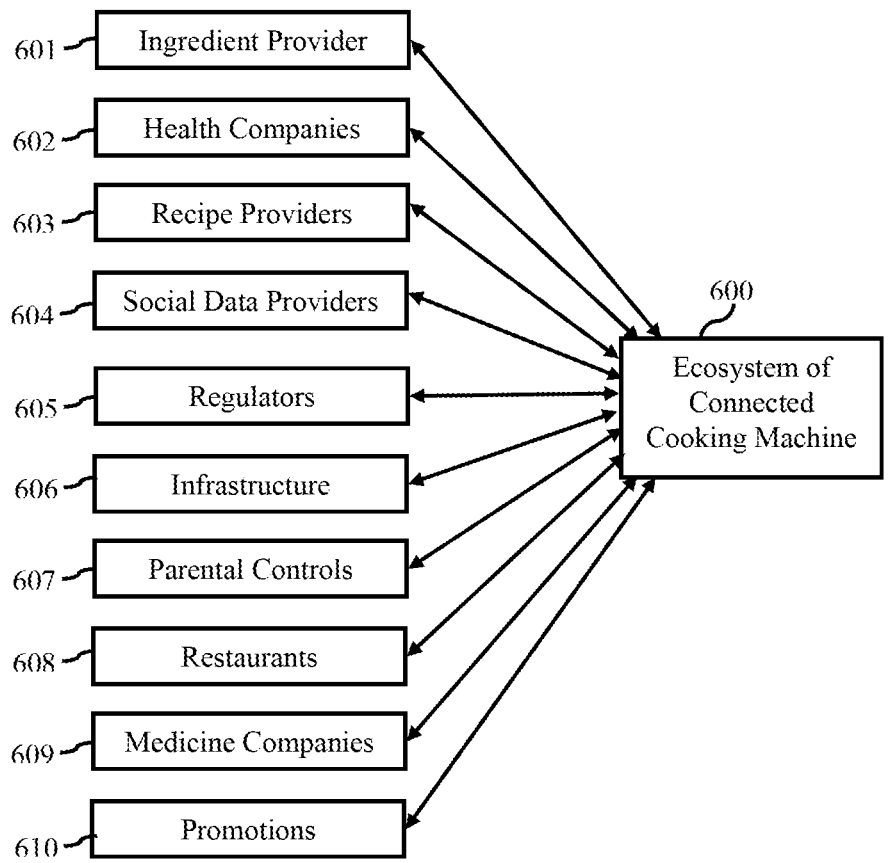
FIG. 6 illustrates a block diagram of a plurality of interfaces communicatively connected to the cooking machine, according to one embodiment herein.

FIG. 6 illustrates a plurality of interfaces to the cooking machine, according to one embodiment herein. An Ecosystem of Connected Cooking Machine 600 comprises the inputs from a plurality of sources such as Ingredient Provider 601. Health Companies 602, Recipe Providers 603, Social Data Providers 604, Regulators 605, Infrastructure 606, Parental Controls 607, Restaurants 608, Medicine Companies 609 and Promotions 610.

Figure 7:
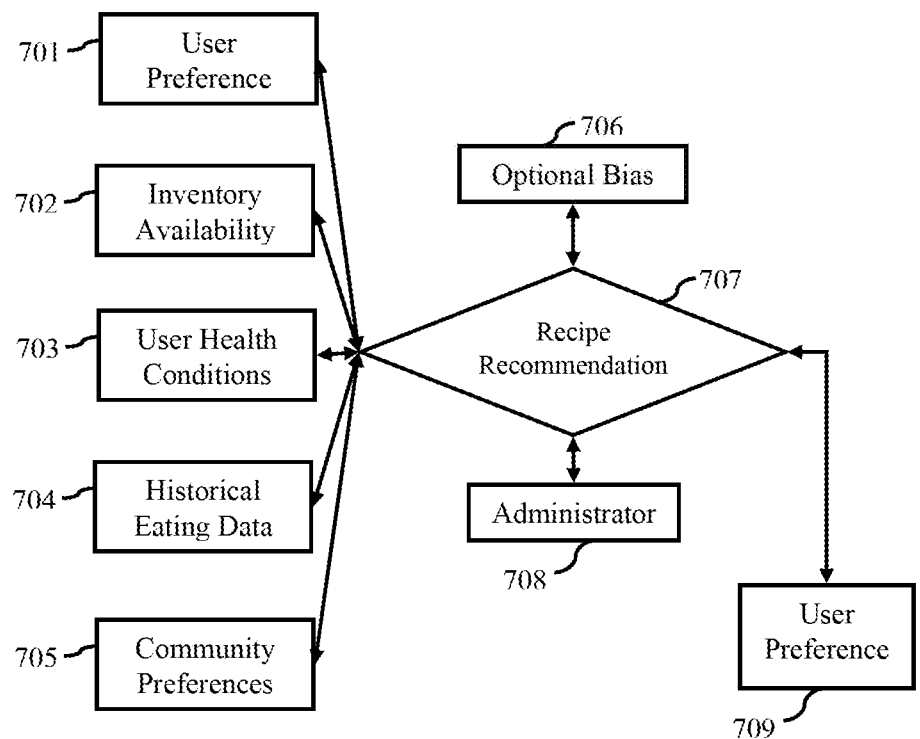
FIG. 7 illustrates a functional block diagram of a system for recipe recommendation, according to an embodiment herein.

FIG. 7 illustrates the process of recipe recommendation, according to an embodiment herein. A Recipe Recommendation module 707 is provided with a plurality of inputs such as User Preference 701, Inventory Availability 702, User Health Conditions 703, Historical Eating Data 704 and Community Preferences 705. The Recipe Recommendation module 707 also takes inputs from Optional Bias module 706 and Administrator module 708 to provide a User Preference 709.

Figure 8:
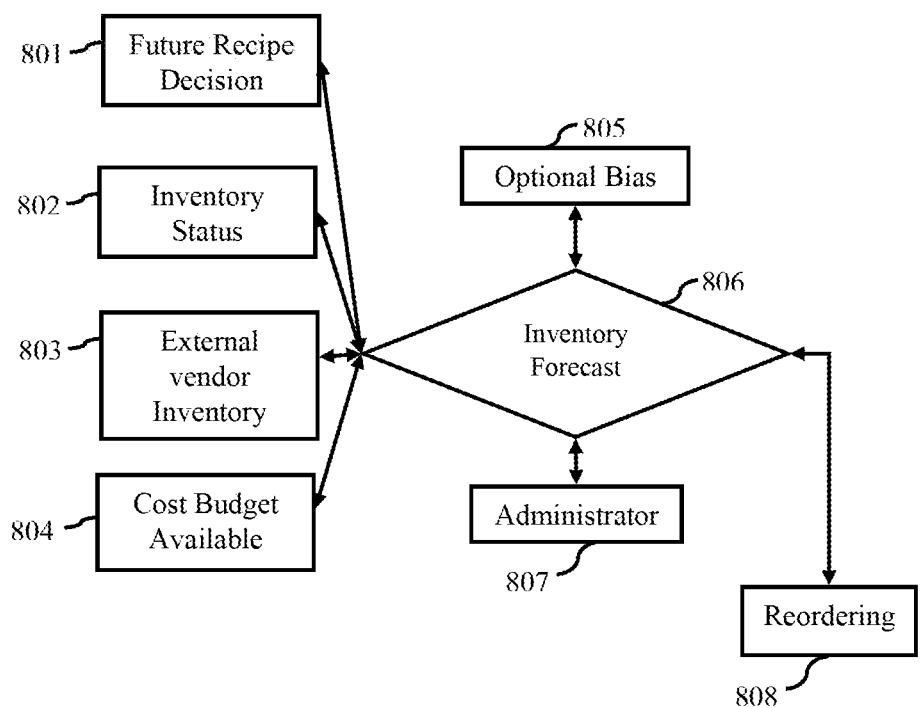
FIG. 8 illustrates a functional block diagram of a system for inventory forecast, according to an embodiment herein.

FIG. 8 illustrates the process of inventory forecast, according to an embodiment herein. An Inventory Forecast module 806 is provided with a plurality of inputs such as Future Recipe Decision 801, Inventory Status 802, External vendor Inventory 803 and Cost Budget Available 804. The Inventory Forecast module 806 also takes inputs from Optional Bias module 805 and Administrator module 807 to provide a Reordering 808 of ingredients.

Figure 9:
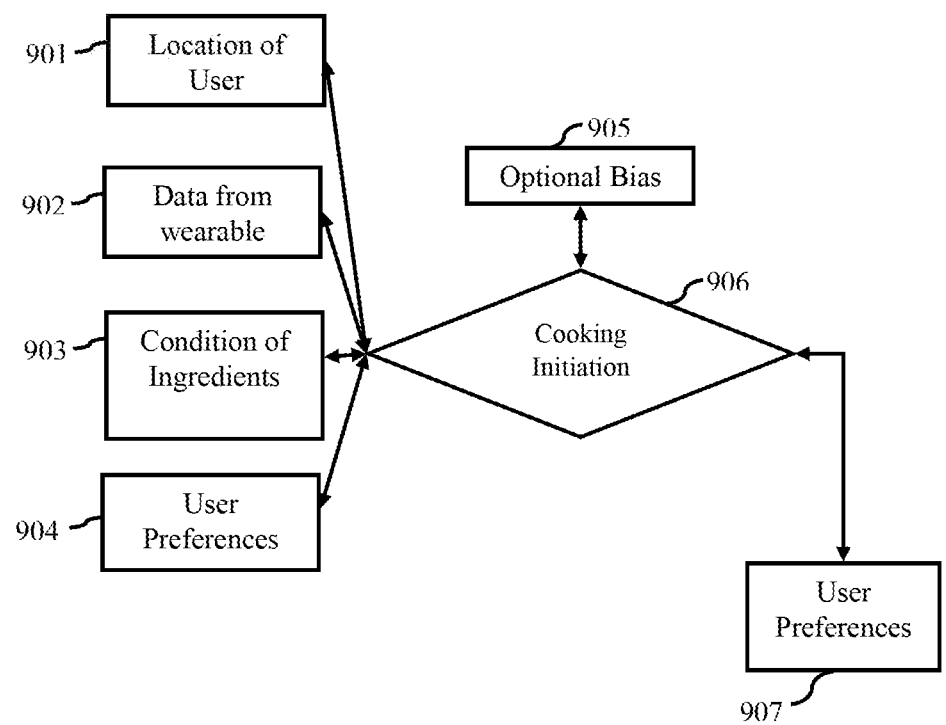
FIG. 9 illustrates a functional block diagram of a system for executing the process of decision on cooking instantiation, according to an embodiment herein.

FIG. 9 illustrates the process of decision on initiating the cooking process, according to an embodiment herein. A Cooking Initiation module 906 is provided with a plurality of inputs such as Location of the User 901, Data from Wearable 902, Condition of Ingredients 903 and User Preferences 904. The Cooking Initiation module 906 also takes inputs from Optional Bias module 805 to provide User Preferences 907.

Figure 10:
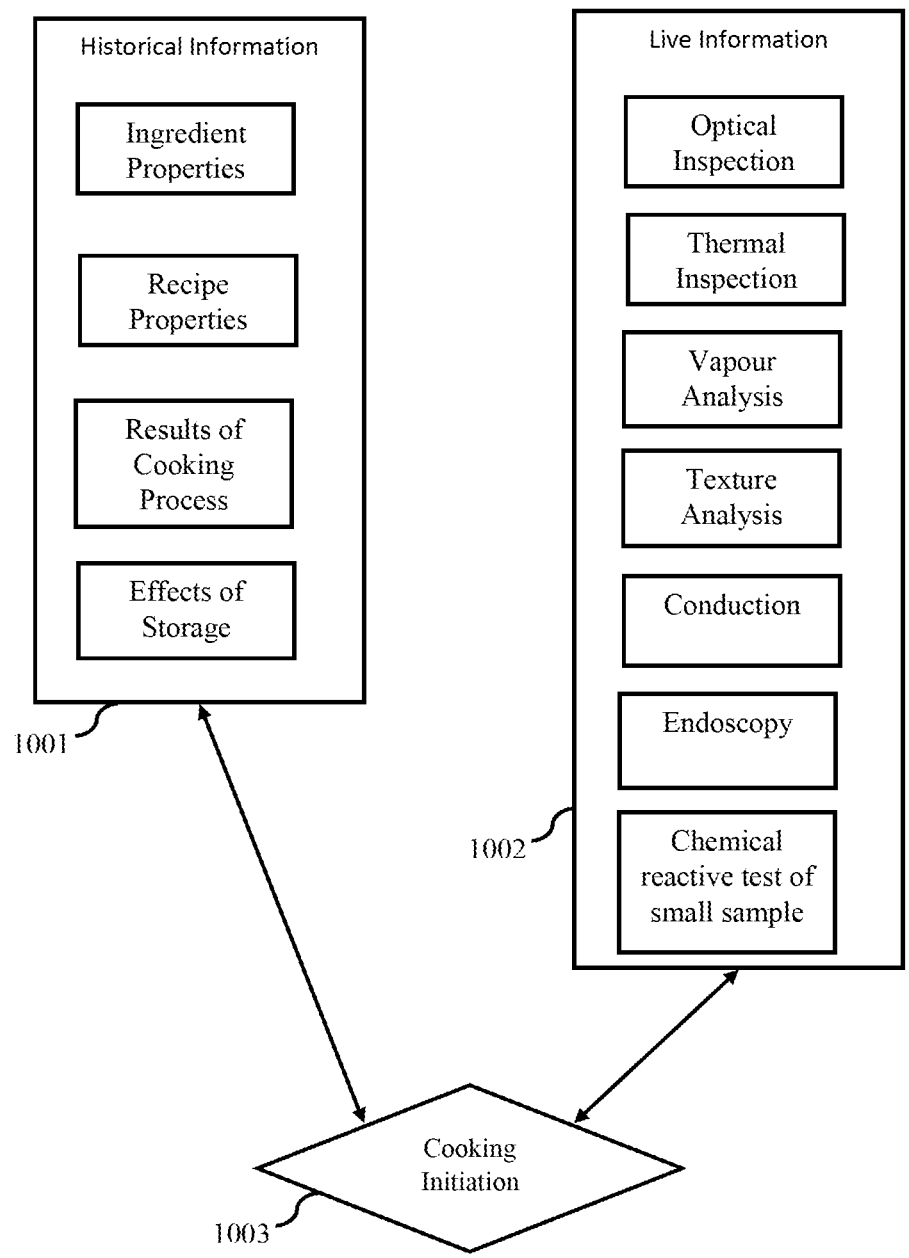
FIG. 10 illustrates a functional block diagram of a system for pre-processing the ingredients before preparing the food, according to an embodiment herein.

FIG. 10 illustrates the pre-processing of the ingredients before preparing the food, according to an embodiment herein. A Cooking Initiation module 1003 receives inputs from Historical Information module 1001 and Live Information module 1002. Historical Information module 1001 comprises information such as Ingredient Properties, Recipe Properties, Results of Cooking Process and Effects of Storage. Live Information module 1002 comprises information from a plurality of live processes such as Optical Inspection, Thermal Inspection, Vapour Analysis, Texture Analysis, Conduction, Endoscopy and Chemical Reactive test of small sample.

According to an embodiment herein, there are three sources of input on historical data collection of the food/nutrient consumption. The data from the usage of the networked cooking machine themselves is the first source. The user has already used cooking machine at work or home or at different locations. Each machine reports to the central cloud based infrastructure on the food prepared and the inputs in that content which is used in estimation.

The second source is the external devices that track user consumption. For example, networked spoon or a wearable watch that detects the number of times the user performed the action of taking food from container to his mouth.

The third is the biometric wearable devices, which is configured to report the nutrient levels. An example is heart rate, ECG, blood sugar levels of users. This invention does not focus into these methods. These is further augmented with the actual input of the user himself. For example, networked spoon or a wearable watch that detects the number of times the user performed the action of taking food from container to his mouth.

According to an embodiment herein, there are two methods of how the nutrient levels are measured. In the first method, each cartridge that contains the food item comes with the information about the nutrient levels of the contents stored. This is programmed by the supplier of the nutrient.

The second method is by inspection of the properties of the material by evaluating parameters such as color, texture and electrical conductivity. These measurements are compared with historically stored patterns of ingredient type data. For eg. Tomatoes with conductivity of x is mapped with historical data in the cloud.

According to an embodiment herein, a cooking apparatus includes a cooking pan and an induction based heating element which contains the cooking pan. Both form one unit when fixed with a handle but can be easily separated. The pan and heating element are easily detached or attached. The pan has a valve that pops up when pressure is built. This cuts the Infra-red beam, which in turn switches off the heating element to prevent further heating. An excess pressure built up is gently released through the safety valve mounted on the handle. The safety valve is manually operated to release all steam with the press of a button. The top surface of the heating element contains sensors which measure the temperature of the pan surface and the weight of the pan. If the temperature crosses safe operating levels, the heating is automatically cut off to prevent burning. The heating element comes with a timer which is manually controlled or controlled automatically by a smartphone over bluetooth or wifi. Complete control of the heating element is performed automatically through an app or manually by the users pressing the corresponding buttons or through a bluetooth/wifi device. To control the heating element, a pair of spaced contact switches are embedded in the unit through which the user can set the time and intensity of heating. The switches are also linked to a bluetooth/wifi enabled circuitry to control the heating element remotely.

According to an embodiment herein, to operate the apparatus described above, the operator first adds the suitable volume of moist food as per the recipe requirements. The portion of food is any edible tissue such as animal, seafood, vegetable or eggs. The operator then closes the pan and places it over the heating device. The operator then switches on the heating device manually or remotely or through an app. The said food gets pressure baked as described above for the set time after which the pressure is vented automatically or manually. This setup allows food to get cooked very fast with minimal water, if food is dry or without any water or if food is juicy. For example, it normally takes about eight to ten minutes to cook a 250 g of deboned chicken breast using convention boiling methods, with a resulting weight loss of about thirty percent or higher. Using the method and apparatus of the present invention, such deboned chicken breast is cooked in 5 minutes with a weight loss of only about ten percent.

In addition to the rapid and thorough cooking of the food portion, the other advantages are minimal labor needed, minimal skill needed, enhanced colors due to the short cooking time preventing volatiles and flavor from leaving the food portion during cooking, particularly if little or no cooking liquid is used. Moreover, the food does not get dried out, as in baking but remains juicy.

According to an embodiment herein, the aforesaid control of heating element and monitoring is provided in a variety of ways. Improved results are obtained if the induction heating element is contained in a cylindrical container, which also insulates the cooking pan and promotes faster cooking.

The embodiments herein are described in detail above for purposes of illustration only and is not intended to be limited by this description or otherwise to exclude any variation or equivalent arrangement that would be apparent from, or reasonably suggested by, the foregoing disclosure to the skill of the art.

The various embodiments herein provide an automatic food preparation and management system that is distributed across a plurality of geographic locations. The various embodiments herein provide a method and a system for having a shared kitchen or a virtual restaurant, which aggregates recipes from multiple chefs or food providers and prepares food instantly of based on a schedule chosen by users. The various embodiments herein provide a method and a system for understanding, grouping, classifying, targeted advertising, match making, and friend recommendation based on cooking and eating preferences. The system also comprises an automatic inventory management module is configured to manage the availability of a plurality of ingredients for preparation of food. The inventory management module is also configured to receive the information about the availability of ingredients in a plurality of storage locations through the sensors module. The inventory management module is configured to receive the information about the type of food the system is scheduled to cook and automatically alert the end-point devices about the availability of the ingredients. The inventory management module is enabled to order the ingredients through online e-commerce websites and provide the location to which the ingredients are to be delivered. The recipe and menu building module is configured to receive the information about the food intake pattern of a user, amount of nutrients taken by the user and the vital health parameters of the user through a plurality of sensors that are remotely located and connected to the cloud computing module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications. However, all such modifications are deemed to be within the scope of the appended claims.

It is also to be understood that the following claims are intended to cover all of the generic and specific features of the embodiments described herein and all the statements of the scope of the embodiments which as a matter of language might be said to fall there between.

What is claimed is:

1. An automatic food preparation and management system that is distributed across a plurality of geographic locations, the system comprising:
   a hardware processor;
   a memory module, wherein the memory module comprises a plurality of digital data storage devices for storing digital data for automatic food preparation and management;

an analytics module, wherein the analytics module is stored in the memory module;

a plurality of end-point devices, wherein the plurality of end-point devices comprise kitchen appliances and food processing machines located in a plurality of geographical locations, and wherein the plurality of end-point devices comprise kitchen appliances that are connected to a cloud computing module, and wherein the plurality of end point devices are configured to receive a plurality of instructions from the analytics module and cook-food, and wherein the kitchen appliance has a plurality of processing chambers, and wherein the plurality of processing chambers are configured to perform heating, boiling, cooling, spraying, baking, cooking, pressure baking (flash cooking), cold pressure frying, and cleaning operations of the plurality of ingredients, and dish washing operations, and wherein the plurality of ingredients are moved from one chamber to next, based on conditions, and wherein the conditions include time, input from a plurality of sensors in a sensor module, and wherein all the end-point devices are configured to work independently and in coordination with other end-point devices, and the kitchen appliance has a user interface where a user is enabled to order for what he wants, and wherein the kitchen machine enables the user to browse through all items that are to be cooked out of the plurality of ingredients available during the ordering process, and wherein the kitchen appliance has a machine configurator to decide on what is to be cooked accommodating constraints that include Quantity required, the plurality of ingredients available, Time available, and Storage required, wherein the kitchen appliance has a camera and biometric capabilities to identify the user to recognize his preferences in suggesting items;

a cloud computing module, wherein the cloud computing module connects the plurality of end-point devices, and wherein the system enables gifting recipes or items so that a morn is enabled to gift a cake by picking a recipe (or creating a recipe) and pushing the recipe to a target ID of a son who lives several thousand kilometers away, and wherein the system enables mom to pay for the plurality of ingredients that is ordered by the machine to cook the item she forwarded thereby enabling to send the cooked food remotely, and wherein the cloud computing module enables a restaurant to order or replenish the plurality of ingredients used by covering a cost of ordering them to the machine, which is batched/grouped in batches;

a communication module, wherein the communication module is configured to establish communication between the plurality of end-point devices;

a plurality of sensors connected to the analytics module, the cloud computing module and the communication module;

an inventory management module, wherein the inventory management module is connected to the analytics module, the cloud computing module and the communication module, and wherein the inventory management module keeps record of a perishable time either from its internal database or from an input from the store, and wherein the inventory management module is configured to dispose a perishable item and place an order based on a record of time; and a recipe and menu building module, wherein the recipe and menu building module is connected to the analytics module, the cloud computing module and the communication module, and wherein the recipe and menu building module is run on the hardware processor, and wherein the recipe and menu building module is configured to receive an information related to a food intake pattern of the user, an amount of nutrients taken by the user and a plurality of vital health parameters of the user through the plurality of sensors that are remotely located and connected to the cloud computing module;

a Cooking Initiation module configured to receives inputs from a historical information module and a Live information module, and wherein Historical Information module comprises information comprising Ingredient Properties, Recipe Properties, Results of Cooking Process and Effects of Storage, and wherein Live Information module comprises information from plurality of live processes comprising Optical Inspection, Thermal Inspection, Vapor Analysis, Texture Analysis, Conduction, Endoscopy and Chemical Reactive test of small sample.

2. The system according to claim 1, wherein the analytics module is run on the processor, and wherein the analytics module is configured to analyze the inputs from the plurality of sensors and the plurality of end-point devices, and wherein the analytics module is configured to decide the type of food to be prepared by the system based on the inputs from the plurality of sensors and the plurality of end-point devices.

3. The system according to claim 1, wherein the analytics module is configured to send a plurality of instructions to the plurality of end-point devices through the communication module.

4. The system according to claim 1, wherein the plurality of end-point devices are provided with add-on modules that are configured to connect the plurality of endpoint devices to the system through the cloud computing module.

5. The system according to claim 1, wherein the sensors module comprises the plurality of sensors that are configured to measure an availability of the plurality of ingredients required to cook food, and wherein the sensors module also comprises the plurality of sensors for measuring the food and nutrition intake of a plurality of humans and to provide the information regarding the food and nutrition intake to a processing module and the cloud computing module.

6. The system according to claim 1, wherein the plurality of sensors comprises audio, visual and biometric sensors that are configured to communicate the sensor output to the cloud computing module.

7. The system according to claim 1, wherein the inventory management module is run on the hardware processor, and wherein the inventory management module is configured to manage or control and regulate an availability of the plurality of ingredients required for a preparation of food, and wherein the inventory management module is configured to receive an information about the availability of the plurality of ingredients in a plurality of storage locations through the sensors module, and wherein the inventory management module is configured to receive an information related to a type of food scheduled to be cooked by the system, and wherein the inventory management module is configured to automatically alert the plurality of end-point devices regarding the availability of the plurality of ingredients.

8. The system according to claim 1, wherein the inventory management module is configured to place an order for purchasing the plurality of ingredients through online ecommerce websites and notify a location for delivery of the plurality of ingredients purchased.

9. The system according to claim 1, wherein recipe and menu building module is configured to receive an information regarding an availability of a plurality of ingredients at a location of the users, and wherein the recipe and menu building module is configured to prepare a personalized menu of food for every user depending on the availability of the plurality of ingredients and a plurality of health parameters of the user and wherein the recipe and menu building module is configured to provide a recipe of a food to be prepared and a plurality of instructions for preparing the food to the plurality of end-point devices through the analytics module.

* * * * *